United States Patent
Uno et al.

(10) Patent No.: US 11,561,455 B2
(45) Date of Patent: Jan. 24, 2023

(54) LIGHT SHIELDING UNIT, LENS BARREL COMPRISING THE SAME, AND METHOD FOR MANUFACTURING MOVABLE BLADE

(71) Applicant: Panasonic Intellectual Property Management Co., Ltd., Osaka (JP)

(72) Inventors: Tetsuya Uno, Osaka (JP); Satoshi Fukuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 323 days.

(21) Appl. No.: 16/770,154

(22) PCT Filed: Dec. 13, 2018

(86) PCT No.: PCT/JP2018/045822
§ 371 (c)(1),
(2) Date: Jun. 5, 2020

(87) PCT Pub. No.: WO2019/117237
PCT Pub. Date: Jun. 20, 2019

(65) Prior Publication Data
US 2020/0301247 A1    Sep. 24, 2020

(30) Foreign Application Priority Data
Dec. 13, 2017 (JP) ............................. JP2017-238748

(51) Int. Cl.
*G03B 9/06* (2021.01)
*H04N 5/225* (2006.01)

(52) U.S. Cl.
CPC ............. *G03B 9/06* (2013.01); *H04N 5/2254* (2013.01)

(58) Field of Classification Search
None
See application file for complete search history.

(56) References Cited

U.S. PATENT DOCUMENTS 4,926,202 A * 5/1990 Fukuda ................... G03B 9/18
 396/492
7,287,864 B2 * 10/2007 Shirasu ............. G03B 21/2053
 348/E9.027

(Continued)

FOREIGN PATENT DOCUMENTS

JP  S50-152631 U  12/1975
JP  2006-53410 A   2/2006

(Continued)

OTHER PUBLICATIONS

Internationanl Search Report of corresponding PCT Application No. PCT/JP2018/045822, dated Mar. 12, 2019.

*Primary Examiner* — Leon W Rhodes, Jr.
(74) *Attorney, Agent, or Firm* — Renner, Otto, Boisselle & Sklar, LLP

(57) ABSTRACT

An aperture unit (20) comprises an aperture cover (22), an aperture base (27), and a light shielding portion (24). The aperture cover (22) has an opening (22a) through which light passes. The aperture base (27) is disposed on the downstream side of the aperture cover (22) in the light incidence direction, and has an opening (27a) through which light passes. The light shielding portion (24) is disposed between the aperture cover (22) and the aperture base (27), and has an opening (24d) through which the light that passed through the opening (22a) passes, and a plurality of opaque aperture stop blades (24a, 24b, 24c) that are formed from a polyimide resin and vary the size of the opening (24d).

17 Claims, 6 Drawing Sheets incident direction of light

(56) References Cited

U.S. PATENT DOCUMENTS

| | | | |
|---|---|---|---|
| 7,290,947 B2 | 11/2007 | Naganuma | |
| 8,079,764 B2 * | 12/2011 | Ohno | G03B 9/40 |
| | | | 396/505 |
| 9,952,405 B2 * | 4/2018 | Kondo | G02B 9/64 |
| 2006/0033821 A1 | 2/2006 | Naganuma | |
| 2006/0290901 A1 * | 12/2006 | Moriyama | B32B 3/266 |
| | | | 353/97 |
| 2012/0251095 A1 * | 10/2012 | Ono | G02B 5/003 |
| | | | 359/227 |
| 2018/0074387 A1 * | 3/2018 | Yoshizawa | G03B 9/06 |

FOREIGN PATENT DOCUMENTS

| | | | |
|---|---|---|---|
| JP | 2006-337947 A | | 12/2006 |
| JP | 2011141366 A | * | 7/2011 |
| JP | 2013-020165 A | | 1/2013 |
| JP | 2014-122956 A | | 7/2014 |
| JP | 2016-206380 A | | 12/2016 |
| JP | 2017-161675 A | | 9/2017 |

* cited by examiner

LIGHT SHIELDING UNIT, LENS BARREL COMPRISING THE SAME, AND METHOD FOR MANUFACTURING MOVABLE BLADE

TECHNICAL FIELD

The present disclosure relates to a light shielding unit, a lens barrel comprising this unit, and a method for manufacturing a movable blade.

BACKGROUND ART

A camera or other such imaging device is provided with a plurality of lens groups, an aperture for adjusting the surface area of the opening through which light passes, a shutter unit, and so on.

Patent Literature 1, for example, discloses a lens barrel in which a motor that drives a lead portion for guiding a holding frame of a second lens is disposed on the side closer to the non-subject side than the aperture, and closer to the subject side than the lead portion, in order to decrease the size in the radial direction and reduce flare due to reflection inside the lens barrel.

CITATION LIST

Patent Literature

Patent Literature 1: JP-A 2014-122956

SUMMARY

Technical Problem

However, the following problem is encountered with the above-mentioned conventional light shielding unit.

In recent years it has become increasingly common for the lens to be aimed directly at the sun when an image is captured using a camera or other such imaging device. Also, it is conceivable that the lens may be accidentally directed toward the sun during outdoor imaging.

In this case, the sunlight that is incident in the lens barrel of the imaging device may pass through the lens and locally generate heat of over 100 degrees centigrade inside the lens barrel. More specifically, for example, a part of the plastic movable aperture stop blades or light blocking unit included in the lens barrel may be deformed by the heat generated by sunlight, to the extent that the aperture stop blades can no longer move, resulting in malfunction. The "deformation" referred to here includes melting and softening. If part of the light shielding unit is melted by heat, the melted parts of the light shielding unit and the aperture stop blades will fuse or stick together, so that the aperture stop blades can no longer move.

It is an object of the present invention to provide a light shielding unit with which problems attributable to heat generated by sunlight can be prevented even when imaging is performed with the imaging device pointed toward the sun, as well as a lens barrel equipped with this unit, and a method for manufacturing movable blades.

Solution to Problem

The light shielding unit disclosed herein comprises a first frame body, a second frame body, and a light shielding portion. The first frame body has a first opening through which light passes. The second frame body is disposed on a downstream side of the first frame body in an incident direction of the light, and has a second opening through which the light passes. The light shielding portion is disposed between the first frame body and the second frame body and has a third opening through which the light that has passed through the first opening passes, and a plurality of opaque movable blades that are formed of a polyimide resin and vary a size of the third opening.

Advantageous Effects

With the light shielding unit disclosed herein, it is possible to prevent problems attributable to heat generated by sunlight, even when imaging is performed with the imaging device aimed toward the sun.

DESCRIPTION OF EMBODIMENTS

Embodiments will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 10 including an aperture unit (light shielding unit) 20 according to an embodiment of the present invention will now be described with reference to FIGS. 1 to 5.

Here, the lens barrel 10 in this embodiment has a configuration intended to prevent problems caused by heat in the lens barrel 10 that occur when the photographer intentionally or unintentionally points the lens in the direction of sunlight. The specific configuration of the components will be described below.

(1) Configuration of Lens Barrel 10

Figure 1:
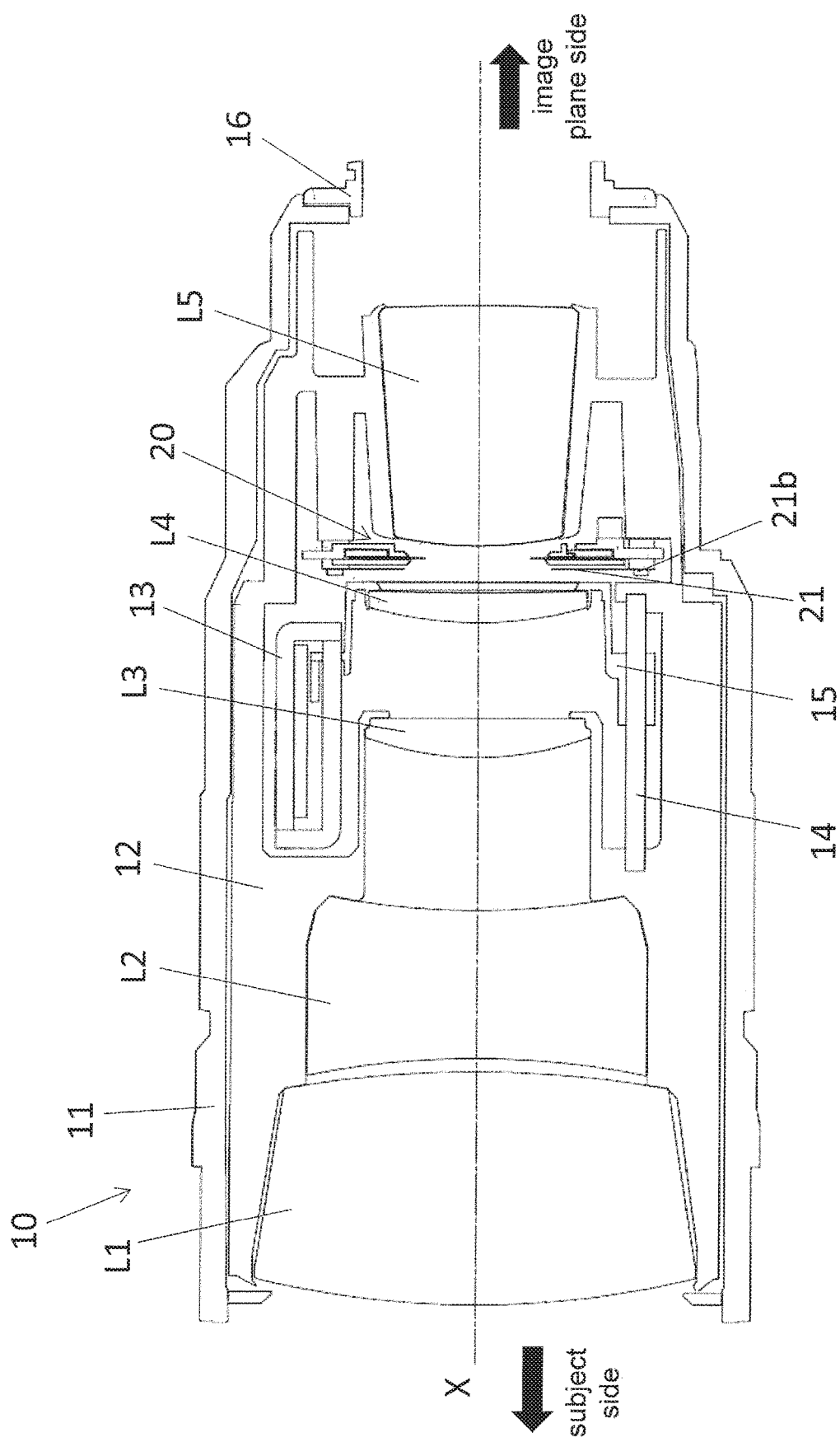
FIG. 1 is a cross section of the configuration of a lens barrel including an aperture unit according to an embodiment of the present invention.

The lens barrel 10 in this embodiment is an interchangeable lens barrel that is mounted on a camera body (not shown), and as shown in FIG. 1, comprises an outer frame 11, an inner frame 12, an actuator 13, a guide pole 14, a fourth lens frame 15, a mount 16, a first lens L1 to a fifth lens L5, and an aperture unit 20.

The outer frame 11 is a substantially cylindrical member that constitutes the outer shell of the lens barrel 10 and envelops various components such as the first lens L1 to the fifth lens L5.

The inner frame 12 is disposed on the inner peripheral surface side of the outer frame 11, and holds the first lens L1 on the farthest upstream side in the light incident direction, the second lens L2 downstream thereof, the third lens L3 downstream thereof, the actuator 13 and the guide pole 14 approximately to the side of the third lens L3, the fourth lens frame 15 (which is held on the guide pole 14 so as to be movable in the optical axis X direction) downstream of the third lens L3, the aperture unit 20 downstream thereof, and the fifth lens L5 downstream thereof.

The actuator 13 is a focus motor that is driven for focusing, is held by the inner frame 12, and when power is supplied from an electrical circuit (not shown), moves the fourth lens frame 15 (which holds the fourth lens L4) back and forth in the optical axis X direction along the guide pole 14.

The guide pole 14 is a rod-shaped member that guides the fourth lens frame 15 (which is driven by the actuator 13) back and forth in the optical axis X direction, is held by the inner frame 12, and is disposed parallel to the optical axis X direction.

The fourth lens frame 15 is included in the lens groups that constitute the optical system of the lens barrel 10, moves in the optical axis X direction to adjust the focal point of the light beam incident on the lens (that is, for focusing), holds the fourth lens L4, and is driven by the actuator 13.

Alternatively, the fourth lens frame 15 holds the fourth lens L4, which moves in the optical axis X direction for adjusting the focal length of the light beam incident on the lens, that is, for zooming, and is driven in conjunction with zoom operation. That is, the fourth lens frame 15 is movable in the optical axis direction for focusing and zooming.

The mount 16 is a portion that is mounted on a camera body (not shown), is held by the outer frame 11, and is disposed on the farthest downstream side in the light incident direction inside the lens barrel 10.

As shown in FIG. 1, the first lens L1 to the fifth lens L5 are an optical system for guiding light in the optical axis X direction, and are disposed in order from the side where light is incident (the subject side).

The first lens L1 is disposed the closest to the subject among the lens group included in the lens barrel 10.

The second lens L2 is disposed inside the inner frame 12 at a position closer to the image plane side (the opposite side from the subject) of the first lens L1.

The third lens L3 is disposed inside the inner frame 12 at a position separated from the second lens L2 by a specific distance to the image plane side.

The fourth lens L4 is a focus lens provided inside the inner frame 12, is movable back and forth in the optical axis X direction by the actuator 13, and is held by the fourth lens frame 15.

The fifth lens L5 is disposed on the downstream side of an aperture unit 20 in the optical axis X direction, and is disposed the closest to the image plane among the lens group included in the lens barrel 10.

The aperture unit 20 is disposed inside the inner frame 12, between the fourth lens L4 and the fifth lens L5, and adjusts the surface area and diameter of the light passing through the first lens L1 to the fourth lens L4, thereby adjusting the amount of light incident on an image sensor provided on the camera body side. The detailed configuration of the aperture unit 20 will be described below.

(2) Configuration of Aperture Unit 20

With the lens barrel 10 of the present embodiment, as shown in FIG. 1, the first lens L1 to the fourth lens L4 are disposed closer to the subject than the aperture unit 20. The first lens L1 to the fourth lens are an optical system having a positive power overall, and as a result, the sunlight passing through the first lens L1 to the fourth lens is converged near the aperture unit 20.

As shown in FIG. 1, the aperture unit 20 is disposed downstream from the fourth lens L4, which functions as a focus lens.

Therefore, with the lens barrel 10 in this embodiment, when the fourth lens L4 moves in the optical axis direction under a focus operation, the converging state of the first lens L1 to the fourth lens may change overall, and sunlight that has passed through the third lens L3 and the like may be converged more strongly near the aperture unit 20. Heat may be more likely to be generated by light convergence when the aperture unit 20 is disposed on the image plane side than when it is disposed on the subject side of the focus lens.

In view of this, in this embodiment, employing the configuration of the aperture unit 20 that is not readily affected by heat as described below will prevent the occurrence of problems attributable to the heat of sunlight.

Figure 2:
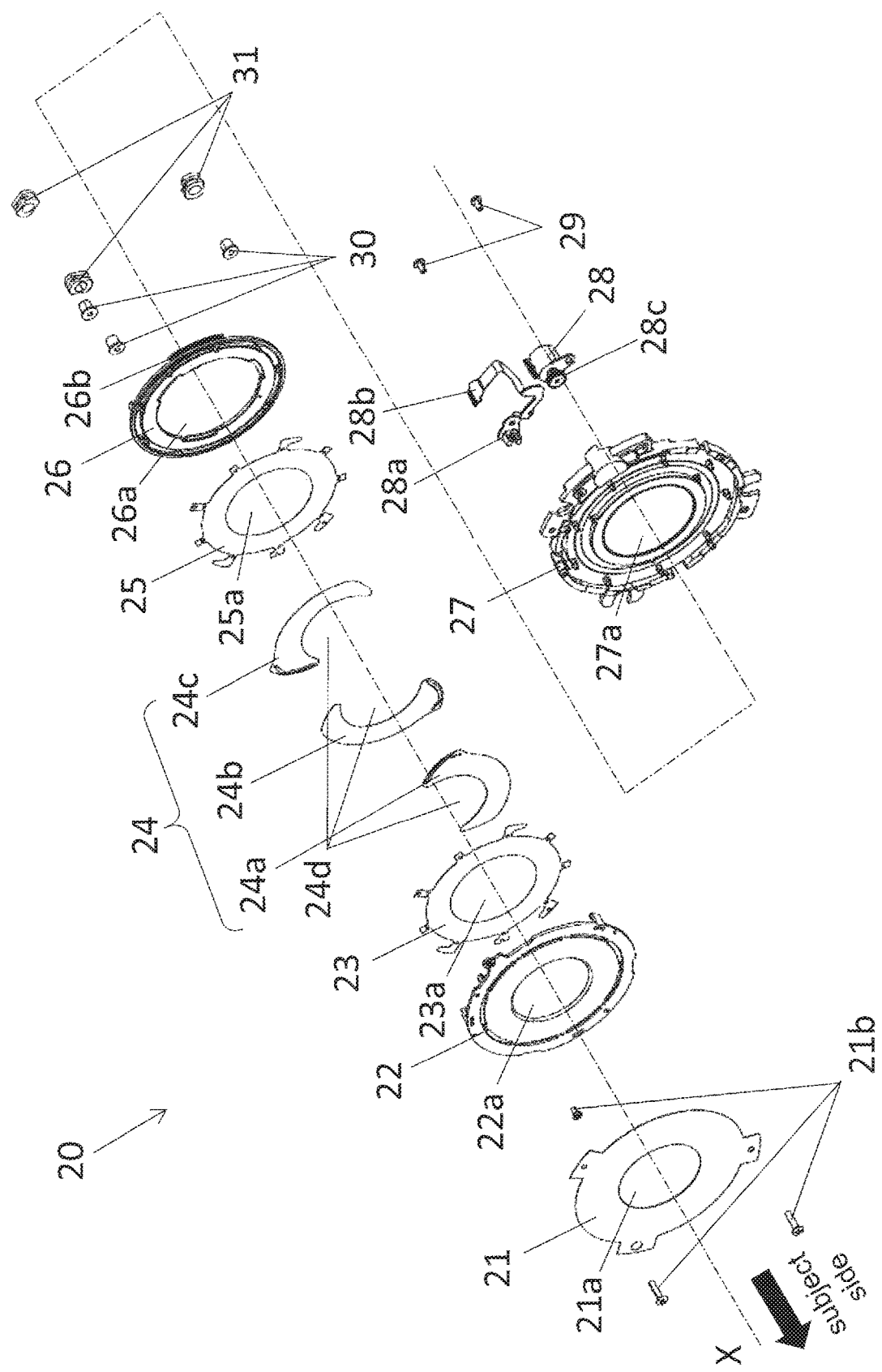
FIG. 2 is an exploded oblique view of the components that constitute the aperture unit included in the lens barrel of FIG. 1.

More specifically, as shown in FIG. 2, the aperture unit 20 has a metal cover (metal plate) 21, an aperture cover (first frame body) 22, a sheet member (sheet-shaped member) 23, a light shielding unit 24 made up of aperture stop blades 24a to 24c, a sheet member (sheet-shaped member) 25, a cam ring 26, an aperture base 27 (second frame body), an aperture drive motor 28, a photo interrupter 28a, an FPC 28b, and a pinion gear 28c.

As shown in FIG. 2, the metal cover (metal plate) 21 is a metal plate disposed the farthest to the subject side in the aperture unit 20, and is fixed to the aperture cover 22 by three screws 21b. The heat resistance of the metal cover (metal plate) 21 is as high as 500 degrees or more, and its deformation due to heat is small, and the metal cover 21 has an opening 21a in the center portion for transmitting light incident from the subject side.

As shown in FIG. 2, the opening 21a is disposed so as to substantially overlap the openings 22a, 23a, 24d, 25a, 26a, and 27a formed in other members in the optical axis X direction, and allows the light incident inside the lens barrel 10 to pass through.

Even if sunlight enters the lens barrel 10, passes through the first lens L1 to the fourth lens and is converged on the metal cover 21 so that heat is generated, since the metal cover 21 has good thermal conductivity, the heat will be dissipated, and the effect of the heat on surrounding parts can be minimized.

Also, the metal cover 21 is disposed adjacent to the subject-side surface of the aperture cover 22, with a gap in between.

Consequently, even if sunlight enters the lens barrel 10, passes through the first lens L1 to the fourth lens, and is converged on the metal cover 21 so that heat is generated, the heat of the metal cover 21 will not readily spread to the cover 22, so deformation of the aperture cover 22 can be effectively prevented.

Figure 4:
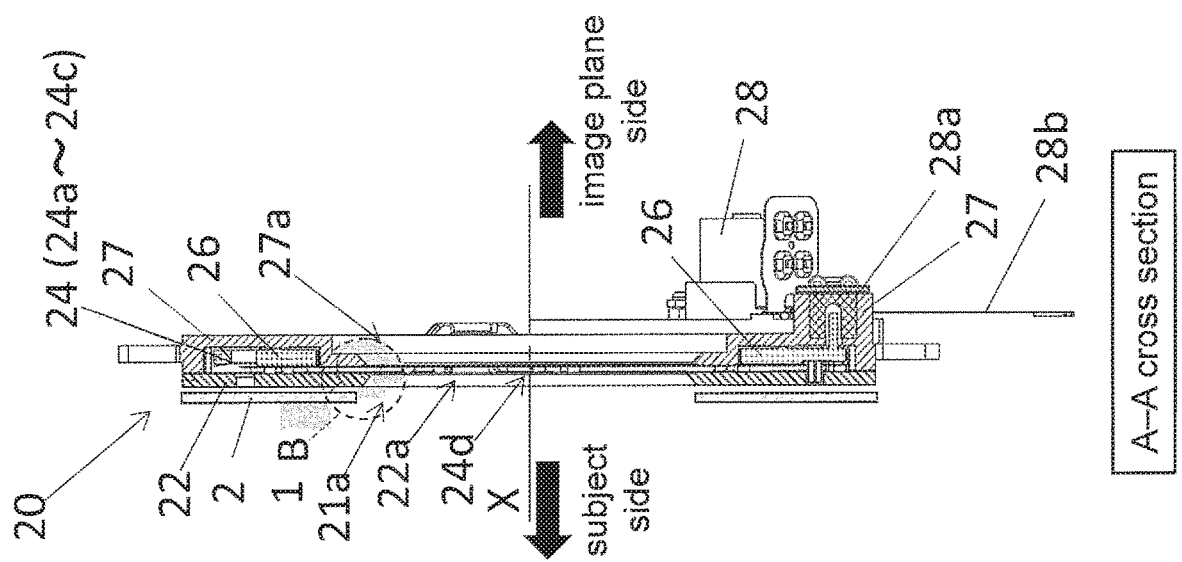
FIG. 4 is a cross section along the A-A line of the aperture unit in FIG. 3.

The aperture cover (first frame body) 22 is similar to the metal cover 21 in that it has an opening (first opening) 22a in the central portion in order to allow the light incident from the subject side to pass through. As shown in FIG. 4, the aperture cover 22 is such that the sheet member 23 (as a sheet-shaped member), the aperture stop blades 24a to 24c, and the sheet member (sheet-shaped member) 25 are disposed in that order starting from the subject side, in between aperture base 27 (discussed below) and the aperture cover 22.

Here, the aperture cover 22 is a substantially disc-shaped member, and is molded from a synthetic resin such as PC (polycarbonate) resin. A PC resin is typically a general-purpose resin having a usable temperature of about 180 degrees, but there may be considerable deformation even at about 100 degrees. Other synthetic resins used here include PBT (polybutylene terephthalate), POM (polyacetal), PPS (polyphenylene sulfide), ABS resin, nylon resin, and so forth, but all of these may undergo considerable deformation even at about 100 degrees.

Furthermore, the aperture cover 22 has a stepped portion 22b that forms a gap away from the aperture stop blades 24a to 24c, on the opening 22a side (inside diameter side) where light is incident at the surface facing the aperture stop blades 24a to 24c.

The stepped portion 22b is disposed on the surface facing the aperture stop blades 24a to 24c, and is made up of the surface on the side closer to the aperture stop blades 24a to 24c in the optical axis X direction, the surface on the side farther away from the aperture stop blades 24a to 24c, and the surface linking these.

Figure 5:
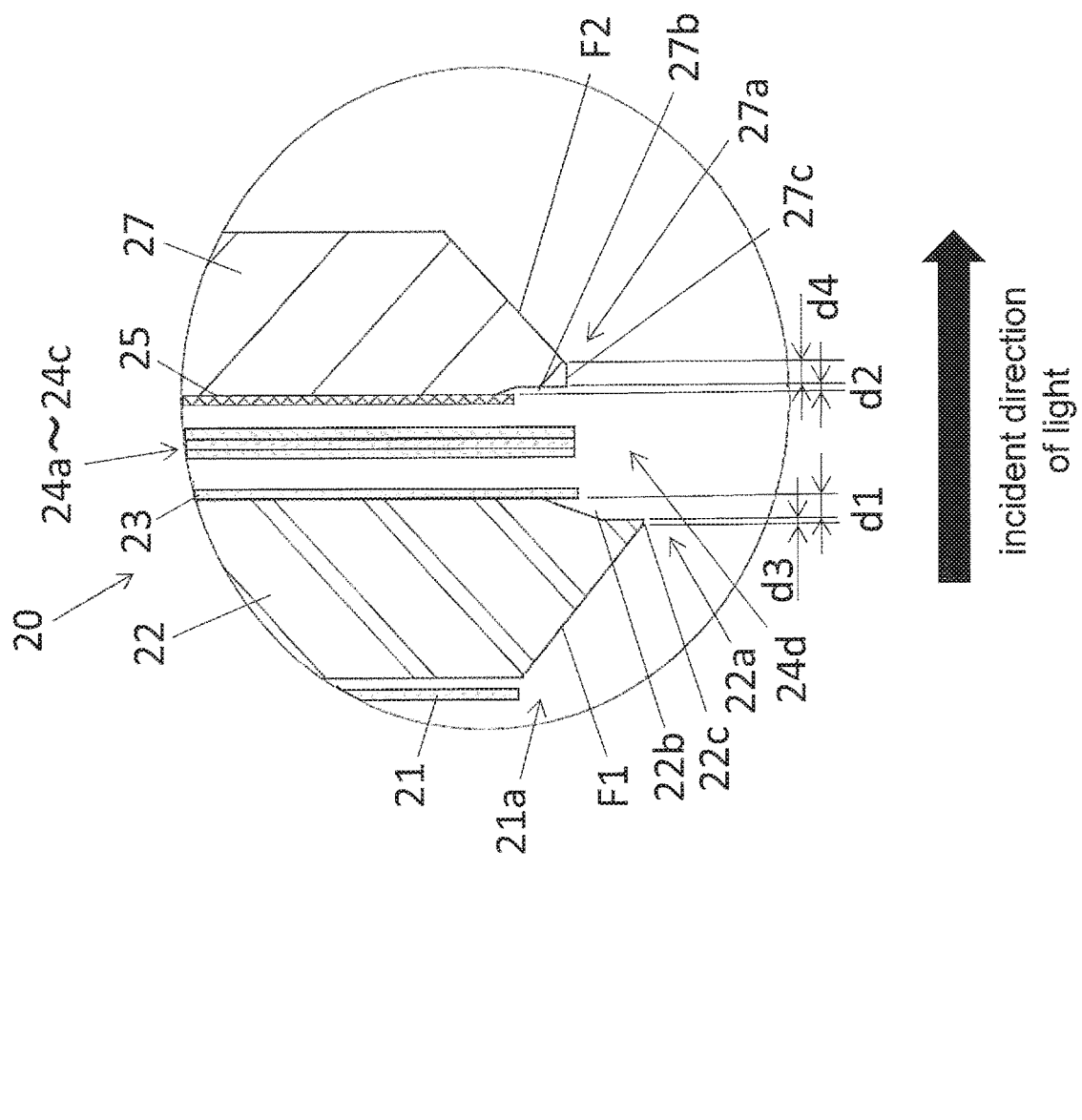
FIG. 5 is a detail view of the B portion in FIG. 4.
Figure 6:
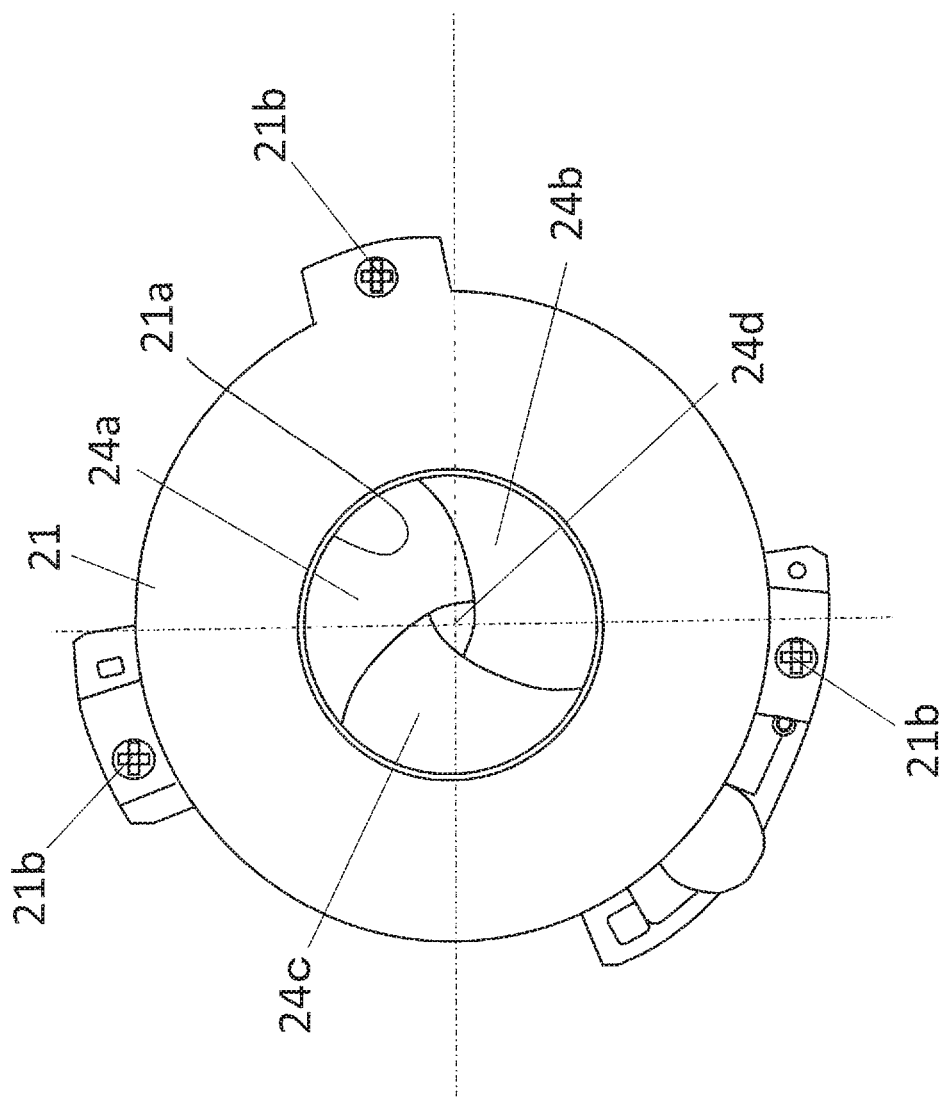
FIG. 6 is a front view of the aperture unit in FIG. 2.

Also, as shown in FIG. 5, the stepped portion 22b is a cutout portion formed at the end on the opening 22a side of the surface of the aperture cover 22 that is facing the aperture stop blades 24a to 24c, and forms a gap that keeps the aperture cover 22 and the blades 24a to 24c from coming into contact with each other.

The cutout portion formed in the aperture cover 22 may be formed by cutting out a part of the aperture cover 22 after the formation of the aperture cover 22, or the aperture cover 22 may be formed in a shape that already includes the cutout portion.

Consequently, during imaging, even if sunlight is incident on the inside of the lens barrel 10 and passes through the first lens L1 to the fourth lens to be converged, thereby generating heat in the vicinity of the aperture unit 20 of the aperture cover 22, causing the portion of the aperture cover 22 near the opening 22a to be deformed, there will still be no contact with the aperture stop blades 24a to 24c because of the stepped portion 22b. Therefore, it is possible to prevent the movement of the aperture stop blades 24a and the like from being hindered by deformation of the aperture cover 22, which is made of PC that has inferior heat resistance compared to the aperture stop blades 24a to 24c.

Also, even if the portion of the aperture cover 22 near the opening 22a should melt under the sunlight converged on the aperture cover 22, there will be no contact with the aperture stop blades 24a to 24c because of the stepped portion 22b. Therefore, the aperture cover 22 will not fuse or stick to the aperture stop blades 24a to 24c, so the movement of the aperture stop blades 24a to 24c will not be hindered.

In this embodiment, the opening 21a of the metal cover (metal plate) 21 is larger than the opening 22a of the aperture cover 22. Therefore, even if sunlight enters the lens barrel 10 and is directly converged near the opening 22a side (inside diameter side) of the aperture cover 22 that is not covered by the metal cover (metal plate) 21, so that the portion near the opening 22a of the aperture cover 22 is deformed, the configuration of the stepped portion 22b will prevent the movement of the aperture stop blade 24a and the like from being hindered.

Also, as shown in FIG. 5, the aperture cover 22 has an inclined surface (first inclined surface) F1 formed at the end on the side closer to the optical axis X so as to approach the optical axis X moving from the upstream side where the light enters, toward the downstream side.

Consequently, even if light entering the aperture unit 20 hits the inclined surface F1 and is reflected, it is less likely to be guided to the downstream side in the optical axis X direction, and the generation of unwanted light is effectively suppressed.

Furthermore, as shown in FIG. 5, the aperture cover 22 has a flat portion (first flat portion) 22c that is substantially parallel to the optical axis X direction, at the end on the side closer to the optical axis X.

The width d3 (the dimension in the optical axis X direction) of the flat portion 22c is formed to be as small as possible.

Consequently, the generation of reflected light at the flat portion 22c can be effectively suppressed, as can the generation of unwanted light in the lens barrel 10.

As shown in FIG. 2, the sheet member (sheet-shaped member) 23 is a substantially disk-shaped sheet member having an opening 23a in the center thereof, and as shown in FIG. 5, is disposed between the aperture cover 22 and the movable aperture stop blades 24a to 24c, its position being restricted by the surface on the image plane side of the aperture cover 22.

The material of the sheet member 23 in this embodiment is PET (a polyester, and specifically, polyethylene terephthalate). The heat resistance temperature of polyester is about 260° C., while there may be considerable deformation even at 100° C., but since the metal cover 21 is provided, almost none of the heat produced by sunlight convergence sheet will reach the sheet member 23. Therefore, deformation of the sheet member 23 due to heat can be minimized, and the movement of the movable aperture stop blades 24a to 24c will not be hindered.

Here, the material of the sheet member 23 can also be a polyimide resin. More specifically, polyimide resins have a heat resistance of 500 degrees or more. When the material of the sheet member 23 is a polyimide resin, the metal cover 21 can be eliminated. Even if sunlight enters the lens barrel 10 and is directly converged on the aperture cover 22, causing the aperture cover 22 to be deformed, since the sheet member 23 made of a polyimide material, which is deformed very little by heat, is interposed between the aperture cover 22 and the movable aperture stop blades 24a to 24c, there will be no hindrance of the movement of the movable aperture stop blades 24a to 24c. Alternatively, even if the sunlight is converged on the aperture cover 22 and a part of the aperture cover 22 should melt, since the sheet member 23 made of a polyimide resin, which is less likely to be melted by heat, is interposed between the aperture cover 22 and the movable aperture stop blades 24a to 24c, the aperture cover 22 will not fuse or stick to the aperture stop blades 24a to 24c, and the movement of the aperture stop blades 24a to 24c will not be hindered.

As shown in FIG. 2, the light shielding portion 24 has three aperture stop blades (movable blades) 24a, 24b, and 24c and an opening (third opening) 24d.

The aperture stop blades (movable blades) 24a, 24b, and 24c each have a rotary shaft hole and a cam hole, and are movable members that adjust the amount of light incident on the imaging element provided on the camera body side by adjusting the opening surface area and the opening diameter of the opening 24d. In each of the aperture stop blades 24a to 24c, the shaft of the aperture base 27 is fitted into the rotation shaft hole (discussed below), the shaft of the cam ring 26 (discussed below) is engaged in the cam hole, and the cam ring 26 rotates around the optical axis, whereupon the aperture stop blades 24a to 24c rotates around the axis of the aperture base 27 so that the opening surface area and the opening diameter of the opening 24d are changed.

The aperture stop blades 24a to 24c are opaque and therefore do not transmit light, and in this embodiment are made of a polyimide resin having high heat resistance. More specifically, polyimide resins have a heat resistance of 500 degrees or more.

Consequently, even if sunlight enters the lens barrel 10 and passes through the first lens L1 to the fourth lens and is thereby converged, and heat of about 400 degrees, for example, is generated in the vicinity of the aperture unit 20, the aperture stop blades 24a to 24c, which have heat resistance of 500 degrees or more, are less likely to be deformed by this heat. This effectively prevents the movement of the movable aperture stop blades 24a to 24c from being hindered.

Also, in this embodiment, the aperture stop blades 24a to 24c are coated on their surfaces with an opaque coating material in order to make them opaque. Consequently, even when the aperture stop blades 24a to 24c are formed using a translucent polyimide resin, they can still be opaque.

Furthermore, in this embodiment, after the aperture stop blades 24a to 24c have been molded into the desired shape (molding step), the surface of the polyimide resin is subjected to an opaque coating treatment (coating step). After this, a treatment is performed to remove the gas components for a specific length of time in a high temperature environment (heat treatment step).

The effect of removing the gas components contained in the polyimide resin or the paint, etc., is that even if heat is generated near the aperture stop blades 24a to 24c, lens fogging and other such problems attributable to the gas components can be prevented.

The above-mentioned heat treatment step may be performed by applying heat to the raw material molded in the molding step, rather than to the movable blades that have been molded in the desired shape in the molding step and coated. Even in this case, lens fogging and other such problems attributable to the gas components can be prevented can be prevented by removing at least a part of the gas components contained in the raw material.

Here, the gas components include the components in the paint that is applied. Furthermore, the paint that is applied contains an adhesive component, a carbon component, a silica component, and a PTFE (polytetrafluoroethylene) component. Adhesive components include acrylic adhesives and polyester adhesives, but a polyester adhesive is advantageous in terms of keeping the amount of gas generation low because it will generate less gas than an acrylic adhesive. Since the silica component and the PTFE (polytetrafluoroethylene) component can also become gas components, it is preferable to eliminate these or reduce their amount.

The sheet member 25 is similar to the sheet member 23 in that it is a substantially disk-shaped sheet-like member having an opening 25a in its central portion as shown in FIG. 2, is disposed between the movable aperture stop blades 24a to 24c and the aperture base 27 as shown in FIG. 5, and is attached to the surface of the aperture base 27 on the subject side.

The cam ring 26 has an opening 26a in its center portion and a gear 26b around its outer peripheral portion, and is held rotatably with respect to the optical axis by the aperture base 27 (discussed below) while being restricted in the radial direction and the optical axis direction. The cam ring 26 rotates around the optical axis when the aperture drive motor 28 rotates, as described below. When the cam ring 26 rotates about the optical axis, the aperture stop blades 24a to 24c rotate around the axis of the aperture base 27, thereby changing the opening surface area and the opening diameter of the opening 24d.

The aperture base (second frame body) 27 is one of the members constituting the aperture unit 20, and is a substantially disk-shaped member that is disposed closest to the image plane, and has an opening (second opening) 27a in its center portion that transmits the light that has entered the lens barrel 10 and passed through the light shielding portion 24. The aperture base 27, like the aperture cover 22, is made of a PC (polycarbonate) resin having a usable temperature of about 180 degrees.

Also, three mounting rubbers 31 into which the sleeve 30 is inserted are provided between the aperture base 27 and the cam ring 26.

Furthermore, as shown in FIG. 5, the aperture base 27 has a stepped portion 27b that forms a gap away from the aperture stop blades 24a to 24c at a portion of the surface facing the aperture stop blades 24a to 24c, on the side of the opening 27a where light is incident.

The stepped portion 27b is disposed on the surface of the aperture base 27 that is facing the aperture stop blades 24a to 24c, and is constituted by the surface on the side closer to the optical axis X direction with respect to the aperture stop blades 24a to 24c, the surface on the far side, and the surface linking these.

Also, as shown in FIG. 5, the stepped portion 27b is a cutout portion formed at the end on the opening 27a side (inside diameter side) of the surface of the aperture base 27 that is facing the aperture stop blades 24a to 24c. A gap is formed to prevent the aperture base 27 and the aperture stop blades 24a to 24c from coming into contact with each other.

Consequently, during imaging, even if sunlight enters the lens barrel 10, passes through and is converged by the first lens L1 to the fourth lens, generating heat near the aperture unit 20, so that the portion of the aperture base 27 that is near the opening 27a is deformed, the aperture stop blades 24c and the aperture base 27 will not be in contact with each other because of the stepped portion 27b that is in between them. Therefore, it is possible to prevent the movement of the aperture stop blades 24c and the like from being hindered by the deformation of the PC aperture base 27, whose heat resistance is inferior to that of the aperture stop blades 24a to 24c.

Also, as shown in FIG. 5, the aperture base 27 has an inclined surface (second inclined surface) F2 formed at the end on the side closer to the optical axis X, so as to move away from the optical axis X from the upstream side where the light enters toward the downstream side.

Consequently, the light incident on the aperture unit 20 will be less likely to hit the inclined surface F2 and be reflected, and the generation of unwanted light can be effectively suppressed.

Here, the width d1 (the dimension in the optical axis X direction) of the stepped portion 22b of the aperture cover 22 and the width d2 (the dimension in the optical axis X direction) of the stepped portion 27b of the aperture base 27 satisfy the following relationship.

$$d1 > d2$$

Consequently, even if sunlight enters the lens barrel 10 during imaging and heat is generated near the aperture cover 22 disposed on the incident side, resulting in deformation of the aperture cover 22, since the width d1 of the stepped portion 27b is greater than the width d2 of the stepped portion 27b of the aperture base 27 disposed on the downstream side, it is possible to prevent the movement of the aperture stop blades 24c and the like from being hindered by the deformation of the aperture base 27. Furthermore, since the stepped portion 27b of the aperture base 27 is formed to be smaller than the stepped portion 22b of the aperture cover 22, the size of the aperture base 27 in the optical axis X direction can be reduced, and the aperture unit 20 can be thinner.

Furthermore, as shown in FIG. 5, the aperture base 27 has the flat portion (second flat portion) 27c that is substantially parallel to the optical axis X direction at the end on the side closer to the optical axis X.

The width d4 (the dimension in the optical axis X direction) of the flat portion 27c satisfies the following relationship.

$$d3<d4$$

Consequently, the surface area of the flat portion 22c in the optical axis X direction is made smaller than the surface area of the flat portion 27c, which effectively suppresses the generation of reflected light at the flat portion 22c on the light incident side, which in turn effectively suppresses the generation of unwanted light in the lens barrel 10.

The diameter of the opening 22a of the aperture cover 22 is smaller than the diameter of the opening 27a of the aperture base 27, as shown in FIG. 5.

Consequently, the opening 22a on the side of the aperture cover 22 disposed on the upstream side in the optical axis X direction has a smaller diameter than the opening 27a of the aperture base 27 disposed on the downstream side, so light that has passed through the opening 22a is less likely to strike the end on the aperture base 27 side, etc., and generate unwanted light.

Figure 3:
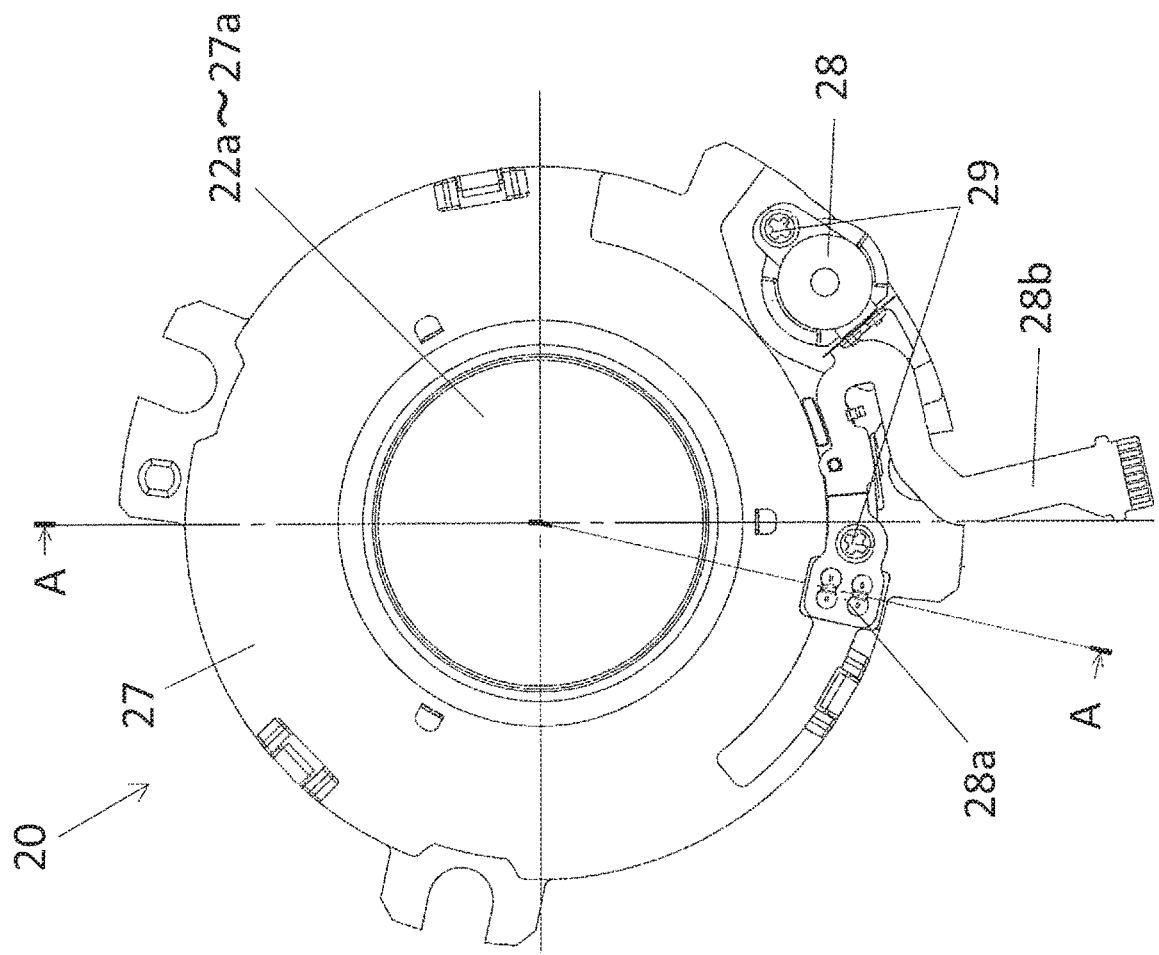
FIG. 3 is a rear view of the aperture unit in FIG. 2.

The photo interrupter 28a has a light emitter and a light receiver, and is provided for outputting the blocking and receiving of the light entering the lens barrel 10 to a lens control portion (not shown). As shown in FIGS. 3 and 4, the photo interrupter 28a is attached with screws 29 to the surface of the aperture base 27 on the image plane side.

The aperture drive motor 28 is held by the aperture base 27 and is electrically connected to an FPC 28b (discussed below), and the shaft is rotated by power supplied from an electric circuit (not shown).

The FPC 28b is a flexible printed circuit board, and as shown in FIG. 2, the photo interrupter 28a and the aperture drive motor 28 are connected to each other, and are connected to an electrical circuit (not shown) via a connector. The FPC 28b is attached to the surface of the aperture base 27 on the image plane side, as shown in FIGS. 3 and 4.

The pinion gear 28c is a gear that transmits a drive force for driving the aperture stop blades 24a to 24c, and is press-fitted to the shaft of the aperture drive motor 28. The pinion gear 28c meshes with the gear 26b of the cam ring 26, and when the aperture drive motor 28 rotates, the pinion gear 28c rotates, resulting in the rotation of the cam ring 26. As shown in FIGS. 3 and 4, the aperture drive motor 28 and the photo interrupter 28a are attached by screws 29 to the surface of the aperture base 27 on the image plane side.

As described above, with the lens barrel 10 in this embodiment, the aperture unit 20 has a heat resistant structure in order to prevent problems attributable to heat within the lens barrel 10 generated when the user intentionally or unintentionally points the lens in the direction of sunlight.

Here, if the lens is pointed toward the sun during imaging, there is the risk that sunlight that has entered the lens barrel 10 may be converged near the aperture unit 20 by the lens or the like and generate heat. The heat generated here may rise to 400 degrees or more. In particular, in a configuration in which the lens barrel 10 is a so-called large-diameter lens and the focus lens (fourth lens L4) is disposed closer to the subject side than the aperture unit 20, if the lens barrel 10 is pointed toward the sun with the focal state set to the closest distance, that is, with the focus lens (fourth lens L4) in the closest position, there is the risk that especially high-temperature heat may be generated inside the lens barrel 10.

In view of this, in this embodiment, the aperture unit 20 comprises the aperture cover 22, the cam ring 26, and the light shielding portion 24 as shown in FIG. 5. FIG. 5 shows a state in which the aperture stop blades 24a to 24c of the aperture unit 20 are in their retracted position (a state in which the opening is fully opened).

The aperture cover 22 has the opening 22a that allows light to pass through. The aperture base 27 is disposed on the downstream side of the aperture cover 22 in the light incident direction, and has the opening 27a through which light passes. The light shielding portion 24 has the opening 24d through which light that has passed through the opening 22a passes, and the plurality of opaque aperture stop blades 24a, 24b, and 24c, which are molded from a polyimide resin and vary the size of the opening 24d, and is disposed between the aperture cover 22 and the aperture base 27.

Consequently, since the opaque aperture stop blades 24a to 24c are molded from a highly heat-resistant polyimide resin, even if, for example, heat of about 400 degrees is generated by sunlight in the lens barrel 10, deformation of the aperture stop blades 24a to 24c can be suppressed, and hindrance of the movement of the movable aperture stop blades 24a to 24c can be effectively prevented.

As a result, even if the lens is pointed toward the sun, it is possible to prevent the occurrence of problems in the lens barrel 10 attributable to heat generated by the sunlight.

Other Embodiments

An embodiment of the present invention was described above, but the present invention is not limited to or by the above embodiment, and various modifications are possible without departing from the gist of the invention.

(A)

In the above embodiment, an example was given in which the movable aperture stop blades 24a to 24c were made opaque by coating them with a opaque coating material, but the present invention is not limited to this.

For example, the aperture stop blades may be made opaque by mixing a pigment or the like into the polyimide material during the molding of the aperture stop blades from a polyimide resin. Alternatively, an opaque sheet may be affixed to the surface of a translucent polyimide resin molded article.

(B)

In the above embodiment, an example was given in which the content of the present invention was applied to the aperture unit 20 mounted in the lens barrel 10, but the present invention is not limited to this.

For example, the configuration of the light shielding unit may be applied to a lens shutter, a focal plane shutter on the camera body side, or some other such portion, instead of the aperture unit.

(C)

In the above embodiment, an example was given in which both the aperture cover 22 and the aperture base 27 were provided with the stepped portions 22b and 27b for preventing contact with the aperture stop blades 24a to 24c, but the present invention is not limited to this.

For example, the configuration may be such that a stepped portion for preventing contact with the aperture stop blades is provided only on the aperture cover 22 side corresponding to the first frame body disposed on the subject side of the aperture unit where light enters. Since the sunlight comes from the subject side, very little light strikes the aperture base 27 side, and a sufficient effect can be obtained as long as the stepped portion 22b is provided just on the aperture cover 22 side.

(D)

In the above embodiment, an example was given in which the metal cover 21 was disposed on the side of the aperture unit 20 closest to the subject, with a specific gap away from the aperture cover 22, but the present invention is not limited to this.

For example, the aperture unit may be configured without a metal cover.

However, in that case, providing a metal cover on the upstream side of the aperture cover has the effect of preventing heat from being generated when sunlight directly hits the aperture cover, which has low heat resistance, and in light of this, a configuration including a metal cover is preferable.

However, if the material of the sheet member 23 is a polyimide resin, the metal cover 21 can be eliminated. Even if sunlight enters the lens barrel 10 and is directly converged on the aperture cover 22, causing deformation of the aperture cover 22, the movement of the movable aperture stop blades 24a to 24c will not be hindered because the sheet member 23, which is made of a polyimide material that is resistant to thermal deformation, is interposed between the aperture cover 22 and the movable aperture stop blades 24a to 24c.

(E)

In the above embodiment, an example was given in which the aperture unit 20 included the three movable aperture stop blades 24a to 24c, but the present invention is not limited to this.

For example, the number of movable blades included in the aperture unit is not limited to three, and may be two, or four or more.

(F)

In the above embodiment, an example was given in which the content of the present invention was applied to the aperture unit 20 (light blocking unit) installed in the interchangeable lens type of lens barrel 10, but the present invention is not limited to this.

For example, this light shielding unit is not limited to an interchangeable lens barrel, and can also be applied to a lens barrel that is integrated with a camera body.

(G)

In the above embodiment, an example was given in which the metal cover 21 was disposed on the side of the aperture unit 20 closest to the subject, at a specific gap away from the aperture cover 22, but the present invention is not limited to this.

For example, the metal cover 21 may be disposed in a state of contact with the aperture cover 22, without a specific gap in between. Even if sunlight enters the lens barrel 10, passes through the first lens L1 to the fourth lens and is converged on the metal cover 21, thereby generating heat, since the metal cover 21 has good thermal conductivity, the heat will be dispersed, and even if the metal cover 21 is disposed without a specific gap between itself and the aperture cover 22, the effect of heat on the resin component can be kept small.

INDUSTRIAL APPLICABILITY

The light shielding unit of the present invention has the effect of preventing the occurrence problems attributable to heat generated by sunlight, even when imaging is performed with the imaging device pointed toward the sun, and is therefore widely applicable to various devices, such as optical devices.

REFERENCE SIGNS LIST

10 lens barrel
11 outer frame
12 inner frame
13 actuator
14 guide pole
15 fourth lens frame
16 mount
20 aperture unit (light shielding unit)
21 metal cover (metal plate)
21a opening
21b screw
22 aperture cover (first frame body)
22a opening (first opening)
22b stepped portion (first stepped portion)
22c flat portion (first flat portion)
23 sheet member (sheet-shaped member)
23a opening
24 light shielding portion
24a, 24b, 24c aperture stop blade (movable blade)
24d opening (third opening)
25 sheet member (sheet-shaped member)
25a opening
26 cam ring
26a opening
26b gear
27 aperture base (second frame body)
27a opening (second opening)
27b stepped portion (second stepped portion)
27c flat portion (second flat portion)
28 aperture drive motor
28a photo interrupter
28b FPC
28c pinion gear
29 screw
30 sleeve
31 mounting rubber
d1, d2, d3, d4 width
F1 inclined surface (first inclined surface)
F2 inclined surface (second inclined surface)
L1 first lens
L2 second lens
L3 third lens
L4 fourth lens (focus lens)
L5 fifth lens
X optical axis

The invention claimed is:

1. A light shielding unit, comprising:
a first frame body having a first opening through which light passes;
a second frame body that is disposed on a downstream side of the first frame body in an incident direction of the light and has a second opening through which the light passes
a light shielding portion that is disposed between the first frame body and the second frame body and has a third opening through which the light that has passed through the first opening passes, and a plurality of opaque movable blades that are formed from a polyimide resin and vary a size of the third opening;
a metal plate that is disposed on an upstream side of the first frame body in the incident direction of the light, wherein at least a part of the metal plate is disposed with a gap between itself and the first frame body, and
the gap provided between the metal plate and the first frame body is parallel with respect to the metal plate.

2. The light shielding unit according to claim 1, wherein a diameter of the first opening is smaller than a diameter of the second opening.

3. The light shielding unit according to claim 1, wherein the first frame body and the second frame body are formed of a synthetic resin.

4. The light shielding unit according to claim 3, wherein the synthetic resin is a polycarbonate resin.

5. The light shielding unit according to claim 1, wherein the portion of the first frame body that is near the first opening is noncontact with the movable blades.

6. The light shielding unit according to claim 1, wherein a surface of the movable blades is given an opaque coating treatment, and
a coating component of the coating treatment contains a polyester adhesive component.

7. A lens barrel, comprising:
a light shielding unit according to claim 1; and
a plurality of lens groups configured to guide the light incident on the light shielding unit in a desired direction.

8. The lens barrel according to claim 7, wherein the light shielding unit is an aperture stop unit configured to adjust an amount of the light that passes through the plurality of lens groups.

9. The lens barrel according to claim 7, wherein the plurality of lens groups have a movable lens configured to move in an optical axis direction, and
the movable lens is disposed on an upstream side of the light shielding unit in an incident direction of the light.

10. The lens barrel according to claim 9, wherein the movable lens is a focus lens with an adjustable focus.

11. A method for manufacturing the movable blades included in the light shielding unit according to claim 1, the method comprising:
a molding step of molding the movable blades in a specific shape; and
a heat treatment step of removing at least some a gas component contained in the movable blades or a raw material by applying heat for a specific length of time to the movable blades molded in a specific shape or to the raw material molded in the molding step.

12. A light shielding unit, comprising:
a first frame body having a first opening through which light passes;
a second frame body that is disposed on a downstream side of the first frame body in an incident direction of the light and has a second opening through which the light passes; and
a light shielding portion that is disposed between the first frame body and the second frame body and has a third opening through which the light that has passed through the first opening passes, and a plurality of opaque movable blades that are formed from a polyimide resin and vary a size of the third opening,
wherein the first frame body further has a first stepped portion on a surface facing the movable blades, the first stepped portion being constituted by a surface on a near side and a surface on a far side in an optical axis direction with respect to the movable blades and a surface connecting the surfaces on the near side and the far side, and forming a gap away from the movable blades,
wherein the first frame body has a first inclined surface formed at an end on a side closer to an optical axis, so as to approach to the optical axis from an upstream side where the light is incident toward a downstream side.

13. A light shielding unit, comprising:
a first frame body having a first opening through which light passes;
a second frame body that is disposed on a downstream side of the first frame body in an incident direction of the light and has a second opening through which the light passes; and
a light shielding portion that is disposed between the first frame body and the second frame body and has a third opening through which the light that has passed through the first opening passes, and a plurality of opaque movable blades that are formed from a polyimide resin and vary a size of the third opening,
wherein the first frame body further has a first stepped portion on a surface facing the movable blades, the first stepped portion being constituted by a surface on a near side and a surface on a far side in an optical axis direction with respect to the movable blades and a surface connecting the surfaces on the near side and the far side, and forming a gap away from the movable blades,
wherein the second frame body further has a second stepped portion on a surface facing the movable blades, the second stepped portion being constituted by a surface on a near side and a surface on a far side in an optical axis direction with respect to the movable blades and a surface connecting the surfaces on the near side and the far side, and forming a gap away from the movable blades.

14. The light shielding unit according to claim 13, wherein a size d2 of the second stepped portion in the optical axis direction satisfies a following relationship with a size d1 of the first stepped portion in the optical axis direction, $$d1 > d2$$

15. A light shielding unit, comprising:
a first frame body having a first opening through which light passes;
a second frame body that is disposed on a downstream side of the first frame body in an incident direction of the light and has a second opening through which the light passes; and
a light shielding portion that is disposed between the first frame body and the second frame body and has a third opening through which the light that has passed through the first opening passes, and a plurality of opaque movable blades that are formed from a polyimide resin and vary a size of the third opening,
wherein the second frame body further has a second stepped portion on a surface facing the movable blades, the second stepped portion being constituted by a surface on a near side and a surface on a far side in an optical axis direction with respect to the movable blades and a surface connecting the surfaces on the near side and the far side, and forming a gap away from the movable blades, wherein the second frame body has a second inclined surface formed at an end on a side closer to an optical axis, so as to move away from the optical axis from an upstream side where the light is incident toward the downstream side.

16. A light shielding unit, comprising:

a first frame body having a first opening through which light passes;

a second frame body that is disposed on a downstream side of the first frame body in an incident direction of the light and has a second opening through which the light passes; and a light shielding portion that is disposed between the first frame body and the second frame body and has a third opening through which the light that has passed through the first opening passes, and a plurality of opaque movable blades that are formed from a polyimide resin and vary a size of the third opening, wherein the first frame body has a first flat portion that is substantially parallel to an optical axis direction, at an end on a side closer to an optical axis, wherein the second frame body has a second flat portion that is substantially parallel to the optical axis direction, at the end on the side closer to the optical axis, and wherein a width d3 of the first flat portion satisfies a following relationship with a width d4 of the second flat portion, d3<d4

17. A light shielding unit, comprising:

a first frame body having a first opening through which light passes;

a second frame body that is disposed on a downstream side of the first frame body in an incident direction of the light and has a second opening through which the light passes; and a light shielding portion that is disposed between the first frame body and the second frame body and has a third opening through which the light that has passed through the first opening passes, and a plurality of opaque movable blades that are formed from a polyimide resin and vary a size of the third opening, further comprising an opaque sheet-like member that is formed of a polyimide resin, which is disposed between the first frame body and the movable blades, whose position is restricted by the first frame body, and which has an opening through which the light that has passed through the first opening passes, and the opening of the sheet-like member is larger than the first opening of the first frame body.

* * * * *